(12) United States Patent
Fridella et al.

(10) Patent No.: US 7,617,216 B2
(45) Date of Patent: Nov. 10, 2009

(54) METADATA OFFLOAD FOR A FILE SERVER CLUSTER

(75) Inventors: Stephen A. Fridella, Belmont, MA (US); Xiaoye Jiang, Shrewsbury, MA (US); Sorin Faibish, Newton, MA (US); John Forecast, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 979 days.

(21) Appl. No.: 11/220,780

(22) Filed: Sep. 7, 2005

(65) Prior Publication Data

US 2007/0055702 A1    Mar. 8, 2007

(51) Int. Cl.
*G06F 17/30* (2006.01)
(52) U.S. Cl. ........................................... 707/10
(58) Field of Classification Search .................... 707/1, 707/8, 10, 200, 210, 202, 203, 204, 205; 709/228, 229; 711/135, 143, 144, 148, 152, 711/161, 162, 216
See application file for complete search history.

(56) References Cited

U.S. PATENT DOCUMENTS

| | | | |
|---|---|---|---|
| 4,780,821 A | 10/1988 | Crossley | 364/200 |
| 5,175,852 A | 12/1992 | Johnson et al. | 395/600 |
| 5,226,159 A | 7/1993 | Henson et al. | 395/650 |
| 5,394,526 A | 2/1995 | Crouse et al. | 395/200 |
| 5,537,645 A | 7/1996 | Henson et al. | 395/650 |
| 5,541,925 A | 7/1996 | Pittenger et al. | 370/94.1 |
| 5,675,802 A | 10/1997 | Allen et al. | 395/703 |
| 5,734,898 A | 3/1998 | He | 395/619 |
| 5,737,747 A | 4/1998 | Vishlitzky et al. | 711/118 |
| 5,774,660 A | 6/1998 | Brendel et al. | 395/200.31 |
| 5,828,876 A | 10/1998 | Fish et al. | 395/601 |
| 5,852,747 A | 12/1998 | Bennett et al. | 395/860 |
| 5,893,140 A | 4/1999 | Vahalia et al. | 711/118 |
| 5,933,603 A | 8/1999 | Vahalia et al. | 395/200.55 |
| 5,944,789 A | 8/1999 | Tzelnic et al. | 709/214 |
| 5,950,199 A * | 9/1999 | Schmuck et al. | 707/8 |
| 5,950,203 A | 9/1999 | Stakuis et al. | 707/10 |
| 5,974,424 A | 10/1999 | Schmuck et al. | 707/201 |
| 5,987,477 A | 11/1999 | Schmuck et al. | 707/201 |

(Continued)

OTHER PUBLICATIONS

Uresh Vahalia, *Unix Internals: The New Frontiers*, Chapter 9, "File System Implementations," Prentice-Hall, Inc., New Jersey, 1996, p. 261-289.

(Continued)

*Primary Examiner*—Diane Mizrahi
(74) *Attorney, Agent, or Firm*—Richard Auchterlonie; Novak Druce & Quigg, LLP

(57) ABSTRACT

A file server system has a cluster of server computers that share access to a file system in shared storage. One of the server computers has primary responsibility for management of access to the file system. In order to reduce the possibility of primary server overload when a large number of the clients happen to concurrently access the same file system, most metadata processing operations are offloaded to secondary server computers. This also facilitates recovery from failure of a primary server computer since only a fraction of the ongoing metadata operations of a primary server computer is interrupted by a failure of the primary server computer. For example, a secondary data mover may truncate, delete, create, or rename a file in response to a client request.

4 Claims, 16 Drawing Sheets

| FILE MAPPING PROTOCOL (FMP) REQUESTS | |
|---|---|
| GET MAP | SECONDARY REQUESTS THE PRIMARY TO GRANT A READ LOCK AND RETURN MAPPING INFORMATION FOR A SPECIFIED FILE |
| ALLOC SPACE | SECONDARY REQUESTS THE PRIMARY TO EXTEND A SPECIFIED FILE |
| COMMIT | SECONDARY REQUESTS THE PRIMARY TO COMMIT A SPECIFIED FILE TO DISK |
| NOTIFY | PRIMARY NOTIFIES SECONDARIES THAT ANY CACHED MAPPING INFORMATION FOR A SPECIFIED FILE HAS BECOME INVALID |
| EXCLUSIVE LOCK INODE | SECONDARY REQUESTS THE PRIMARY TO GRANT AN EXCLUSIVE LOCK AND RETURN A COPY OF AN INODE FOR A SPECIFIED FILE |
| WRITE INODE | SECONDARY REQUESTS THE PRIMARY TO WRITE AN INODE TO A FILE SYSTEM |
| CREATE FILES | SECONDARY REQUESTS THE PRIMARY TO EXPAND THE SECONDARY'S ALLOCATION DIRECTORY |

U.S. PATENT DOCUMENTS

| | | | | |
|---|---|---|---|---|
| 6,023,706 | A | 2/2000 | Schmuck et al. | 707/200 |
| 6,032,216 | A | 2/2000 | Schmuck et al. | 710/200 |
| 6,061,504 | A | 5/2000 | Tzelnic et al. | 395/200.49 |
| 6,085,234 | A | 7/2000 | Pitts et al. | 709/217 |
| 6,161,104 | A | 12/2000 | Stakutis et al. | 707/10 |
| 6,167,446 | A | 12/2000 | Lister et al. | 709/223 |
| 6,173,293 | B1 | 1/2001 | Thekkath et al. | 707/201 |
| 6,185,601 | B1 | 2/2001 | Wolff | 709/203 |
| 6,192,408 | B1 | 2/2001 | Vahalia et al. | 709/229 |
| 6,212,640 | B1 | 4/2001 | Abdelnur et al. | 713/201 |
| 6,230,190 | B1 | 5/2001 | Edmonds et al. | 709/213 |
| 6,324,581 | B1 * | 11/2001 | Xu et al. | 709/229 |
| 6,389,420 | B1 * | 5/2002 | Vahalia et al. | 707/8 |
| 6,453,354 | B1 | 9/2002 | Jiang et al. | 709/229 |
| 6,973,455 | B1 * | 12/2005 | Vahalia et al. | 707/8 |
| 7,010,554 | B2 | 3/2006 | Jiang et al. | 707/205 |
| 7,051,050 | B2 * | 5/2006 | Chen et al. | 707/200 |
| 7,383,286 | B2 * | 6/2008 | Hamanaka et al. | 707/200 |
| 2005/0240628 | A1 | 10/2005 | Jiang et al. | 707/104.1 |

OTHER PUBLICATIONS

Network Working Group, RFC 1094, "NFS: Network File System Protocol Specification," Sun Microsystems, Inc., Santa Clara, CA, Mar. 1989, 27 pages.

Paul L. Leach and Dilip C. Naik, "A Common Internet File System," Microsoft Corporation, Redmond, WA, Dec. 19, 1997, 121 pages.

J. Postel and J. Reynolds, RFC 959, "File Transfer Protocol," ISI, Marina del Rey, CA, Oct. 1985, 69 pages.

J. Satran et al., RFC 3720, "Internet Small Computer System Interface (iSCSI)," Network Working Group, The Internet Society, Reston, VA, Apr. 2004, 257 pages.

"EMC Celerra Highroad," EMC Corporation, Hopkinton, MA, Jan. 2002, 10 pages.

* cited by examiner

| FILE MAPPING PROTOCOL (FMP) REQUESTS ||
|---|---|
| GET MAP | SECONDARY REQUESTS THE PRIMARY TO GRANT A READ LOCK AND RETURN MAPPING INFORMATION FOR A SPECIFIED FILE |
| ALLOC SPACE | SECONDARY REQUESTS THE PRIMARY TO EXTEND A SPECIFIED FILE |
| COMMIT | SECONDARY REQUESTS THE PRIMARY TO COMMIT A SPECIFIED FILE TO DISK |
| NOTIFY | PRIMARY NOTIFIES SECONDARIES THAT ANY CACHED MAPPING INFORMATION FOR A SPECIFIED FILE HAS BECOME INVALID |
| EXCLUSIVE LOCK INODE | SECONDARY REQUESTS THE PRIMARY TO GRANT AN EXCLUSIVE LOCK AND RETURN A COPY OF AN INODE FOR A SPECIFIED FILE |
| WRITE INODE | SECONDARY REQUESTS THE PRIMARY TO WRITE AN INODE TO A FILE SYSTEM |
| CREATE FILES | SECONDARY REQUESTS THE PRIMARY TO EXPAND THE SECONDARY'S ALLOCATION DIRECTORY |

FIG. 7

US 7,617,216 B2

METADATA OFFLOAD FOR A FILE SERVER CLUSTER

FIELD OF THE INVENTION

The present invention relates generally to data storage systems, and more particularly to network file servers.

BACKGROUND OF THE INVENTION

In a data network it is conventional for a network file server containing disk storage to service storage access requests from multiple network clients. The storage access requests, for example, are serviced in accordance with a network file access protocol such as the Network File System (NFS) protocol, or the Common Internet File System (CIFS) protocol. NFS is described, for example, in RFC 1094, Sun Microsystems, Inc., "NFS: Network File Systems Protocol Specification," Mar. 1, 1989. The CIFS protocol is described, for example, in Paul L. Leach and Dilip C. Naik, "A Common Internet File System," Microsoft Corporation, Dec. 19, 1997.

A network file server typically includes a digital computer for servicing storage access requests in accordance with at least one network file access protocol, and an array of disk drives. This server computer has been called by various names, such as a storage controller, a data mover, or a file server. The server computer typically performs client authentication, enforces client access rights to particular storage volumes, directories, or files, and maps directory and file names to allocated logical blocks of storage.

Due to the overhead associated with the network file access protocol, the server computer in the network file server may become a bottleneck to network storage access that is shared among a large number of network clients. One way of avoiding such a bottleneck is to use a network file server system having multiple server computers that provide concurrent access to the shared storage. The functions associated with file access are distributed among the server computers so that one computer may receive a client request for access to a specified file, authenticate the client and authorize access of the client to the specified file, and forward the request to another server computer that is responsible for management of exclusive access to a particular file system that includes the specified file. See, for example, Vahalia et al. U.S. Pat. No. 6,192,408 issued Feb. 20, 2001, incorporated herein by reference.

In a network file server system having multiple server computers that provide concurrent access to the shared storage, the server computers may exchange file data in addition to metadata associated with a client request for file access. For example, as described in Xu et al. U.S. Pat. No. 6,324,581 issued Nov. 27, 2001, incorporated herein by reference, each file system is assigned to a data mover computer that has primary responsibility for managing access to the file system. If a data mover computer receives a client request for access to a file in a file system to which access is managed by another data mover, then the secondary data mover that received the client request sends a metadata request to the primary data mover that manages access to the file system. In this situation, the secondary data mover functions as a Forwarder, and the primary file server functions as the Owner of the file system. The primary data mover responds by placing a lock on the file and returning metadata of the file to the secondary data mover. The secondary data mover uses the metadata to formulate a data access command for accessing the file data over a bypass data path that bypasses the primary data mover.

In practice, the method of Xu et al. U.S. Pat. No. 6,324,581 has been most useful for large input/output (I/O) operations. The method of Xu et al. U.S. Pat. No. 6,324,581 has been used commercially in the following manner. For a small I/O operation of less than a given threshold, for example four kilobytes, of data to be read or written to a file system in storage, then the data mover computer in the network file server that is responsible for managing access to the file system will access the requested data in the conventional fashion. In general, the threshold is smaller than the file system block size. For a larger I/O operation of more than the threshold, then the data mover in the network file server that is responsible for managing access to the file system will function as a metadata server as described in Xu et al. U.S. Pat. No. 6,324,581 by placing a lock on the file to be accessed and returning metadata so that the metadata can be used to formulate a read or write request for accessing the data of the file over a path that bypasses the data mover.

SUMMARY OF THE INVENTION

In a file server computer cluster, it may be desirable for a single one of the server computers to manage the metadata for each file system in order to maintain file system consistency. However, the primary server computer for a large (e.g. terabyte) file system can be overloaded if too many clients simultaneously access the large file system. In accordance with a basic aspect of the present invention, the possibility of such primary server overload is reduced by offloading most metadata processing operations from each primary server computer to secondary server computers. For example, each server computer in the cluster can be either primary or secondary for each file system so that any server computer in the cluster can read or write metadata for any file system. The primary server computer maintains the highest authority in order to resolve any conflict. The goal is to reduce metadata processing of primary file systems to a small fraction (e.g., normally 10% or less) of the processing load on a primary server computer. This prevents the primary server computer from being a bottleneck in the server cluster. This also facilitates recovery from failure of the primary server computer since only a fraction of the ongoing metadata operations of a primary server computer is interrupted by a failure of the primary server computer.

In accordance with one aspect, the invention provides a method of operating a file server system having server computers and storage shared among the server computers. The shared storage contains a file system. Access to the file system is managed by one of the server computers that is primary with respect to the file system, and other server computers are secondary with respect to the file system. The method includes one of the server computers that is secondary with respect to the file system responding to a request from a client for creating, deleting, or renaming a file in the file system by requesting an exclusive lock on a source or target directory for containing the file from the server computer that is primary with respect to the file system. The method further includes the server computer that is primary with respect to the file system responding to the one of the server computers that is secondary with respect to the file system by the server computer that is primary with respect to the file system granting an exclusive lock on the source or target directory and returning a copy of an inode of the source or target directory to the one of the server computers that is secondary with respect to the file system. The method further includes the one of the server computers that is secondary with respect to the file system modifying the inode of the source or target directory in order to create, delete, or rename the file in the file system.

In accordance with another aspect, the invention provides a file server system including shared storage, and multiple server computers linked to the shared storage for accessing a file system in the shared storage. One of the server computers is primary with respect to the file system for managing access to the file system, and others of the server computers are secondary with respect to the file system. Each of the server computers that are secondary with respect to the file system is programmed for responding to a client request for creating, deleting, or renaming a file in the file system by requesting an exclusive lock on a source or target directory for containing the file from the server computer that is primary with respect to the file system. The server computer that is primary with respect to the file system is programmed for responding to each of the server computers that are secondary with respect to the file system by the server computer that is primary with respect to the file system granting an exclusive lock on the source or target directory and returning a copy of an inode of the source or target directory to the server computer that is secondary with respect to the file system. Each of the server computers that is secondary with respect to the file system is programmed for modifying the inode of the source or target directory in order to create, delete, or rename the file in the file system In accordance with yet another aspect, the invention provides a file server system including shared storage, and multiple server computers linked to the shared storage for accessing a file system in the shared storage. One of the server computers is primary with respect to the file system for managing access to the file system, and others of the server computers are secondary with respect to the file system. The server computer that is primary with respect to the file system is programmed for responding to a respective request from each of the server computers that are secondary with respect to the file system for requesting the server computer that is primary with respect to the file system to grant a read lock and return directory mapping information for a specified directory. The server computer that is primary with respect to the file system is also programmed for responding to a respective request from each of the server computers that are secondary with respect to the file system for requesting the server computer that is primary with respect to the file system to extend a specified file. The server computer that is primary with respect to the file system is programmed for responding to a respective request from each of the server computers that are secondary with respect to the file system for requesting the server computer that is primary with respect to the file system to commit a specified file to disk storage. The server computer that is primary with respect to the file system is also programmed for responding to a respective request from each of the server computers that are secondary with respect to the file system for requesting the server computer that is primary with respect to the file system to grant an exclusive lock on an inode for a specified file and return a copy of the inode for the specified file. The server computer that is primary with respect to the file system is also programmed for responding to a respective request from each of the server computers that are secondary with respect to the file system for requesting the server computer that is primary with respect to the file system to write changes to an inode for a specified file.

BRIEF DESCRIPTION OF THE DRAWINGS

Additional features and advantages of the invention will be described below with reference to the drawings, in which:

FIG. 7 shows a table of various requests in accordance with a file mapping protocol (FMP);

Figure 1:
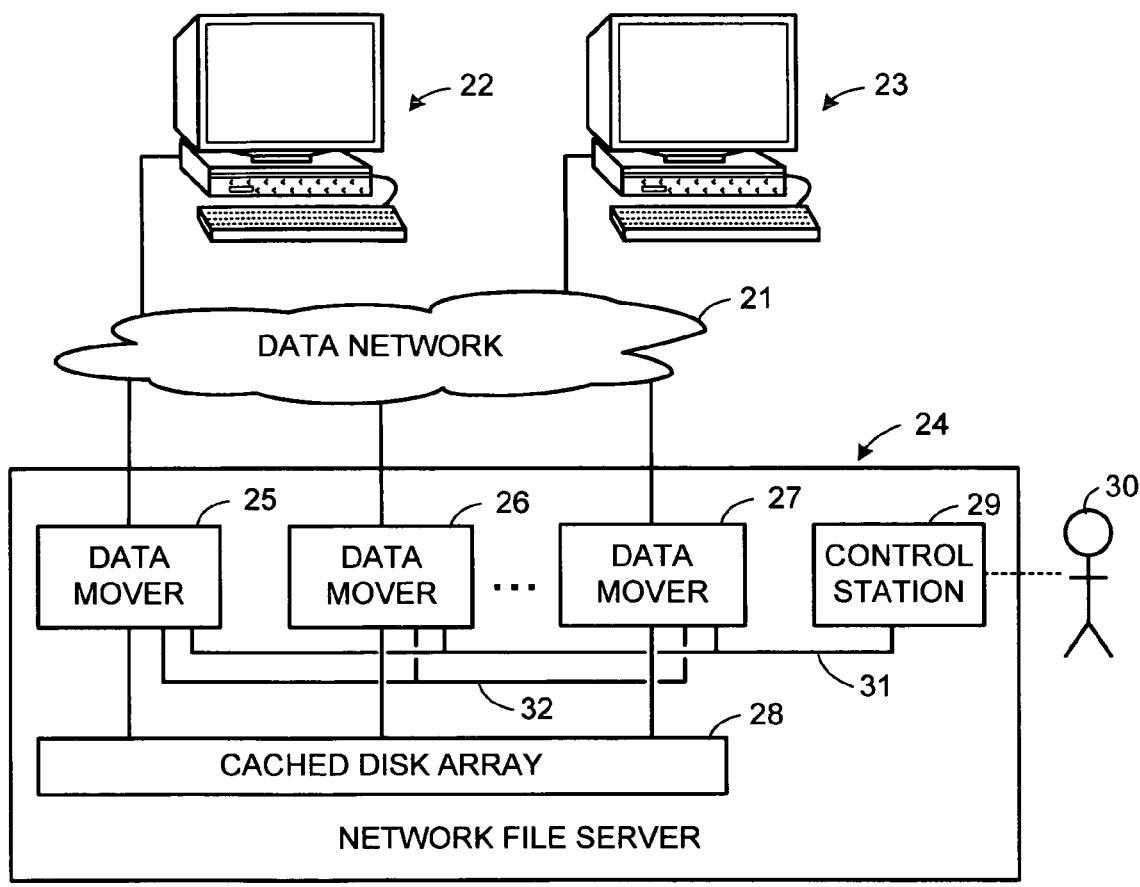
FIG. 1 is a block diagram of a data network including a network file server having a cluster of data mover computers providing client access to shared storage in a cached disk array.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a data processing system incorporating the present invention. The data processing system includes a data network 21 interconnecting a number of clients 22, 23 to one or more servers such as a network file server 24. The data network 21 may include any one or more of network connection technologies, such as Ethernet, and communication protocols, such as TCP/IP. The clients 22, 23, for example, are workstations such as personal computers using either UNIX or Microsoft Windows operating systems. Various aspects of the network file server 24 are further described in Vahalia et al., U.S. Pat. No. 5,893,140 issued Apr. 6, 1999, incorporated herein by reference, and Xu et al., U.S. Pat. No. 6,324,581, issued Nov. 27, 2001, incorporated herein by reference. This kind of network file server is manufactured and sold by EMC Corporation, 176 South Street, Hopkinton, Mass.

The network file server 24 includes a cached disk array 28 and a number of data mover computers, for example 25, 26, 27, and more. The network file server 24 is managed as a dedicated network appliance, integrated with popular network file systems in a way, which, other than its superior performance, is transparent to the end user. The clustering of the data movers 25, 26, 27 as a front end to the cache disk array 28 provides parallelism and scalability. Each of the data movers 25, 26, 27 is a high-end commodity computer, providing the highest performance appropriate for a data mover at the lowest cost. The network file server 24 also has a control station 29 enabling a system administrator 30 to configure and control the file server. The data movers 25, 26, 27 are linked to the control station 29 and to each other by a dual-redundant Ethernet 31 for system configuration and maintenance, and for detecting data mover failure by monitoring heartbeat signals transmitted among the data movers and the control station. The data movers 25, 26, 27 are also linked to each other by a local area IP network 32, such as a gigabit Ethernet.

Figure 2:
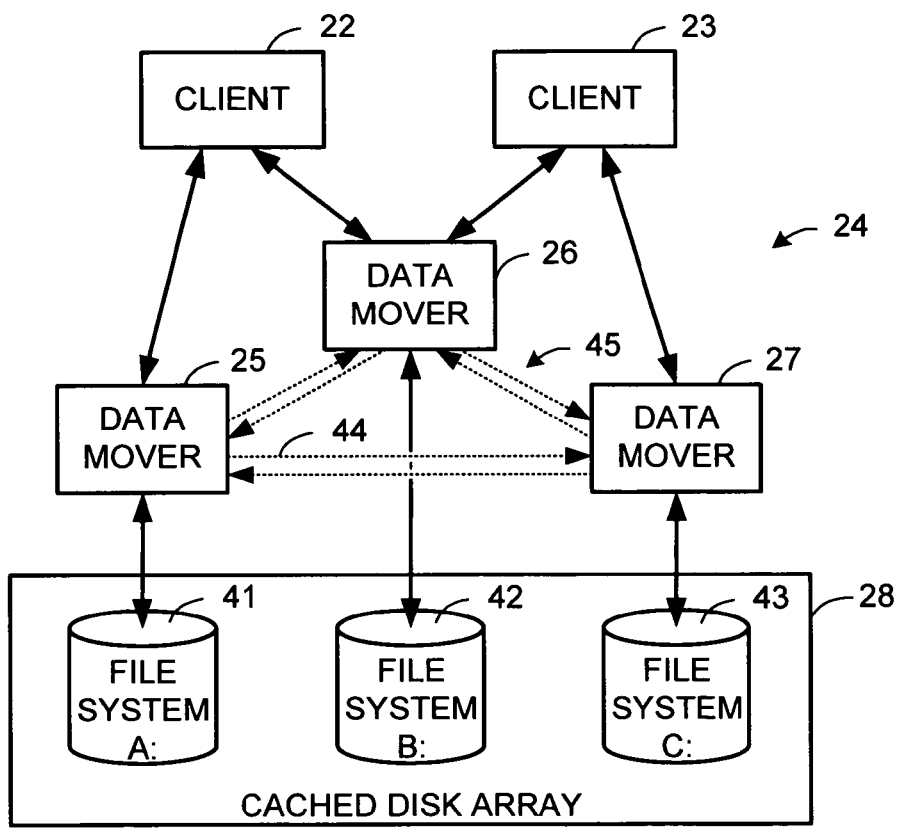
FIG. 2 is a block diagram showing data and control flow among the components of the data network of FIG. 1, including a mesh of TCP connections among the data mover computers.

As shown in FIG. 2, the data mover 25 is primary with respect to a file system 41, the data mover 26 is primary with respect to a file system 42, and the data mover 27 is primary with respect to a file system 43. If the data mover 25, for example, receives a request from the client 22 for access to a file in the file system 43, then the data mover 25 will forward the request over the TCP connection 44 to the data mover 27 in order to obtain access to the file system 43.

For more efficient forwarding, a mesh 45 of TCP connections is established among the data movers 25, 26, 27 by setting up a respective pair of TCP/IP connections in opposite directions between each pair of data movers in the cluster. Each TCP/IP connection (indicated by a dashed arrow) is brought up and maintained by execution of a respective code thread initiating transmission from a respective one of the data movers in the pair. Each TCP connection has a different port number for the source port, and a unique port number for the destination port (with respect to the local high-speed Ethernet among the data movers). For multi-protocol forwarding, a respective mesh of TCP connections is set up among the data movers 25, 26, 27 for each of the high-level file and storage access protocols. For example, for forwarding NFS and CIFS requests, a first mesh is set up for forwarding NFS requests, and a second mesh is set up for forwarding CIFS requests.

The mesh technique is advantageous for fail-over of a failed data mover because each mesh can be re-established by a simple, uniform process upon substitution of a replacement data mover. The replacement data mover takes over the personality of the failed data mover, and starts from a clean connection state.

Figures 3, 4, 5:
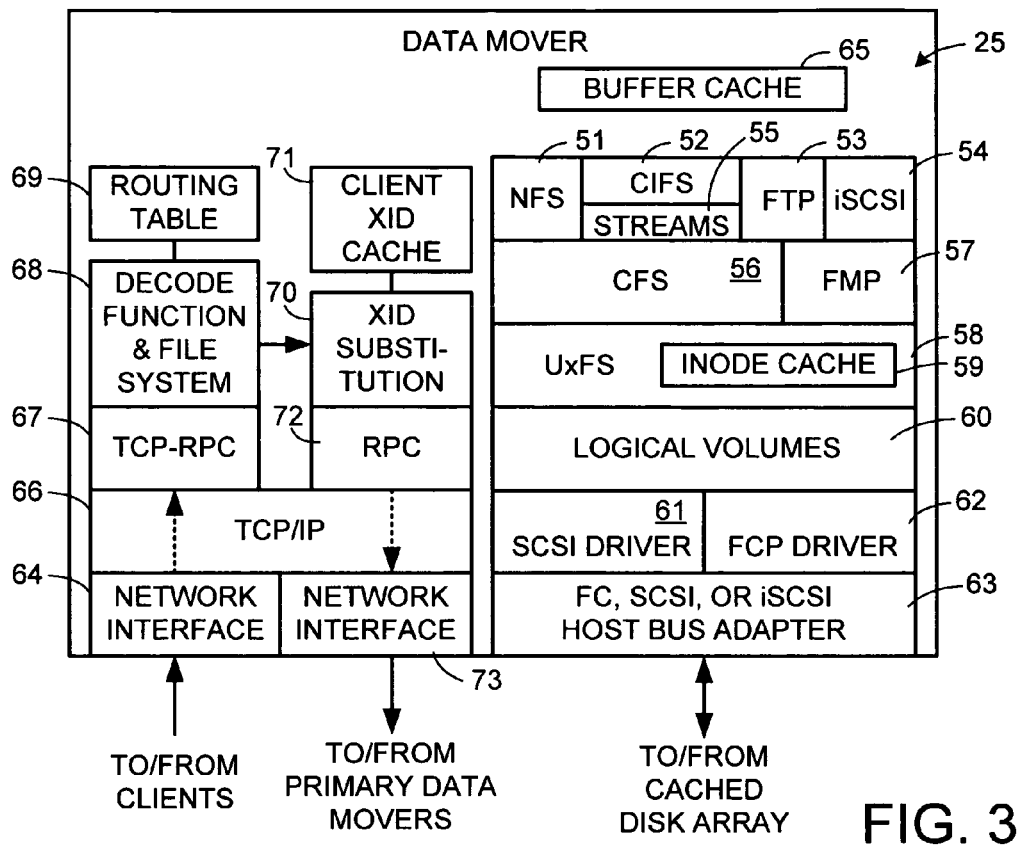
FIG. 3 is a block diagram of software modules within a data mover.
FIG. 4 is schematic diagram of a routing table used in each data mover for the data network of FIG. 2.
FIG. 5 is a is schematic diagram of a client transaction ID cache used in each data mover.

FIG. 3 shows software modules in the data mover 25 introduced in FIG. 1. The data mover 25 has a set of modules for high-level file access protocols used by the clients for accessing files in the network file server. These modules include a network file system (NFS) module 51 for supporting the NFS file access protocol, a Common Internet File System (CIFS) module 52 for supporting the CIFS file access protocol, a module 53 for supporting the File Transfer Protocol (FTP), and a module 54 for supporting the Internet Small Computer Systems Interface protocol. FTP is described in J. Postel and J. Reynolds, Request for Comments: 959, ISI, October 1985.

The iSCSI protocol is described in J. Satran et al., Request for Comments: 3720, Network Working Group, The Internet Society, April 2004.

The CIFS module 52 is layered over a File Streams module 55. The NFS module 51, the CIFS module 53 and File Streams module 55, the FTP module 53, and the iSCSI module 54 are layered over a Common File System (CFS) module 56. The CFS module is layered over a Universal File System (UxFS) module 58. A file mapping protocol (FMP) module 57 is also shown layered next to the CFS module. The UxFS module 58 supports a UNIX-based file system, and the CFS module 56 provides higher-level functions common to NFS and CIFS. The UxFS module 58 maintains a file system inode cache 59. The FMP module 57 provides metadata management services between primary and secondary data movers, as will be further described below.

The UxFS module 58 accesses data organized into logical volumes defined by a module 60. Each logical volume maps to contiguous logical storage addresses in the cached disk array. The module 60 is layered over an SCSI driver 61 and a Fibre-channel protocol (FCP) driver 62. The data mover 25 sends storage access requests through a host bus adapter 63 using the SCSI protocol, the iSCSI protocol, or the Fibre-Channel protocol, depending on the physical link between the data mover 25 and the cached disk array.

A network interface card 64 in the data mover 25 receives IP data packets from the network clients. A TCP/IP module 66 decodes data from the IP data packets for the TCP connection and stores the data in buffer cache 65. For example, the UxFS layer 58 may write data from the buffer cache 65 to a file system in the cached disk array. The UxFS layer 58 may also read data from a file system in the cached disk array and copy the data into the buffer cache 65 for transmission to a network client.

A network client may use the User Datagram Protocol (UDP) for sending requests to the data mover 25. In this case, a TCP-RPC module 67 converts a TCP byte stream into UDP-like messages.

When the data mover receives a client request, a module 68 decodes the function of the request and determines if it accesses a particular file system. If so, a routing table 69 is accessed to determine the data mover that is responsible for management of access to the particular file system. For the system as shown in FIG. 2, the contents of the routing table 69 are shown in FIG. 4. For each file system, the routing table 69 identifies the primary data mover responsible for management of access to the particular file system.

Each request from each client may contain a transaction ID (XID). It is possible that different clients may assign the same XID. Therefore, for forwarding of the request over a mesh, the data mover 25 has an XID substitution module 70 that assigns a new unique XID, and stores in a client XID cache 71 a mapping of the original XID in the client request in association with the IP address of the client and the new unique XID, and substitutes the new unique XID for the original XID in the request before forwarding the request to the primary data mover. The data mover 25 has a network interface 73 to the primary data mover. The client XID cache 71 is shown in FIG. 5.

For forwarding a client request to another data mover, a remote procedure module (RPC) 72 packages the request as a remote procedure call. RPC involves a caller sending a request message to a remote system to execute a specified procedure using arguments in the request message. The RPC protocol provides for a unique specification of procedure to be called, provisions for matching response messages to request messages, and provisions for authenticating the caller to the service and vice-versa. RPC (Version 2) is described in Request for Comments: 1057, Sun Microsystems, Inc., June 1988. In a data mover cluster, the caller is a secondary data mover, and the remote system is a primary data mover.

In order to reduce the possibility of primary server overload when a large number of the clients happen to concurrently access the same file system, most metadata processing operations from each primary data mover are offloaded to secondary data movers. Moreover, if a secondary data mover receives a file access request from a client, it is often possible for the secondary data mover to do most of the metadata processing operations for the file access request. Therefore, it is often possible to reduce the need for forwarding requests to the primary.

In a preferred implementation, the offloading of metadata processing operations is enabled by adding new data structures to the file systems for which access is shared among the primary and secondary data movers, and by adding new requests to the file mapping protocol (FMP). The new data structures include, for example, a respective metadata log file for the primary data mover and each secondary data mover, an allocation directory for each secondary data mover, and an allocation file for each secondary data mover. The new FMP requests, for example, include an "EXCLUSIVE LOCK INODE" request, a "WRITE INODE" request, and a "CREATE FILES" request.

For recovery from a system crash, every metadata write is logged. For example, this is a re-do log of pending state changes, so the log is replayed after a system crash to ensure that all state changes pending at the time of the crash are completed. The general procedure for re-do logging is (1) write to the in-memory file system; (2) write metadata log entry to disk; (3) write metadata to disk; and (4) release the metadata log entry. A metadata log entry can be released by marking a point in the log to indicate that entries before the mark have been released, and the released entries can later be overwritten with new entries. For convenient reference during the recovery process, each file system has its own log within the file system volume. The log identifies the file system and the data mover that is doing each logging operation.

To reduce contention among the writes by the primary and secondaries to the log for a file system, the metadata log for a file system is split so that each data mover writes to its own pre-allocated region of the metadata log. For example, when a secondary changes metadata, it writes the metadata change to its own pre-allocated region of the log. Thus, the logging of metadata writes need not be serialized between the primary and secondaries.

Figure 9:
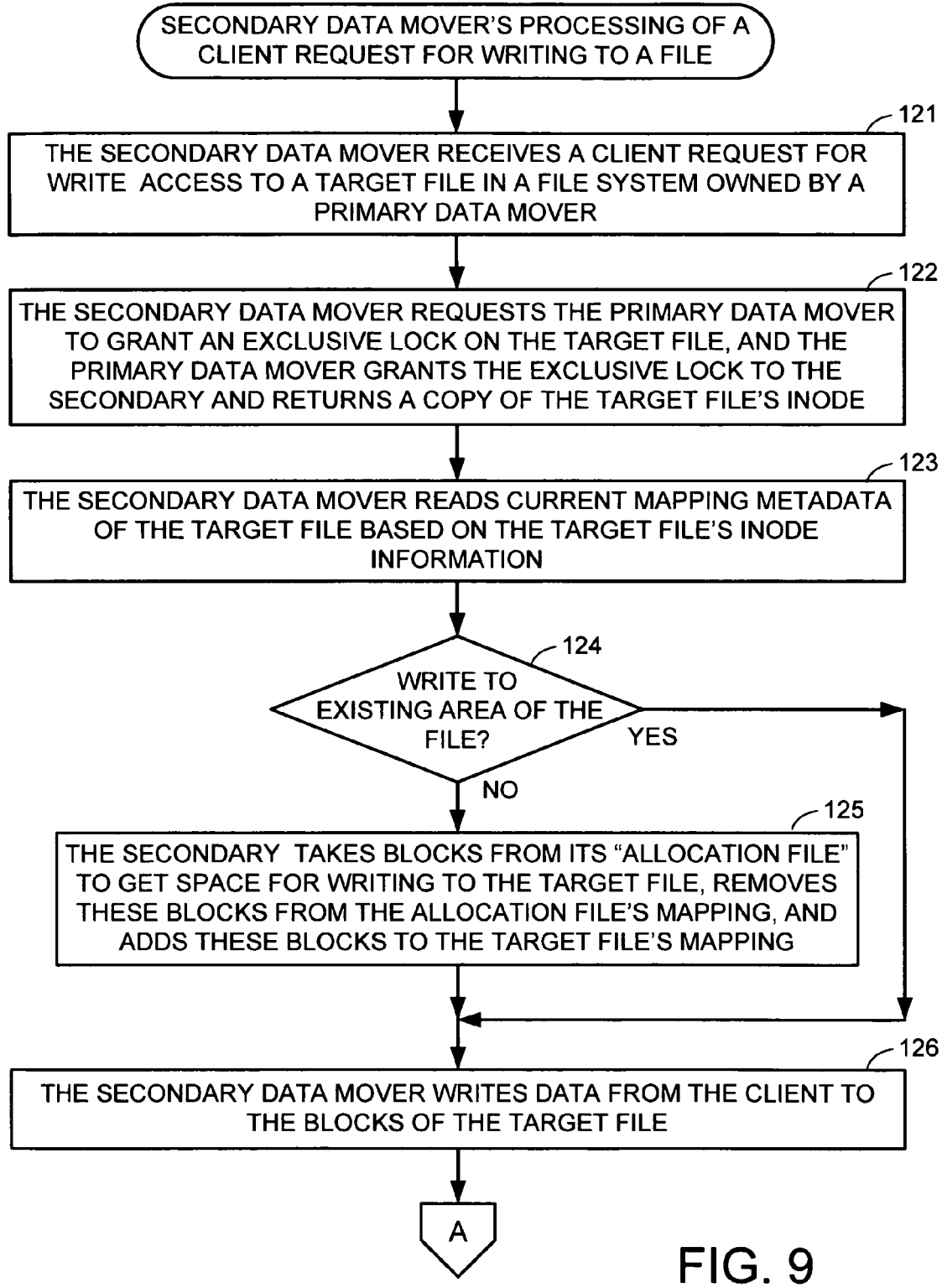
FIGS. 9 and 10 together comprise a flowchart of a secondary data mover's processing of a client request for writing to a file.

As shown in FIG. 9, for example, the file system 41 named "A:" has a metadata log 100 including a log file 101 for the data mover 25, a log file 102 for the data mover 26, and a log file 103 for the data mover 27.

Initially a certain amount of space in the file system log is pre-allocated for use by the primary data mover, and when a secondary mounts the file system, it asks the primary to create a file of contiguous blocks for use as a log by the secondary. The primary creates the file by allocating the space and then committing the space. The secondary then uses this file as its metadata log for the file system. An advantage to a secondary using such a file as its log is that the file will have a time stamp associated with it. This time stamp can be inspected to detect when logging by a data mover was terminated due to failure of the data mover.

The offloading of metadata writes to a secondary data mover has an additional complexity of inode allocation and changes to the mapping of the blocks for a directory or file. Inode allocation is needed for creating a file. Inode de-allocation is needed for deleting a file. A file's block mapping is changed by the extension or truncation of a file.

For a file server having a single data mover, the data mover allocates an inode by finding a free inode in an inode pool and marking it as used in the inode bit map. The data mover allocates data blocks for a file by finding a free data block in a free data block pool and marking it as used in a data block bit map (e.g. a cylinder group bit map).

Figure 6:
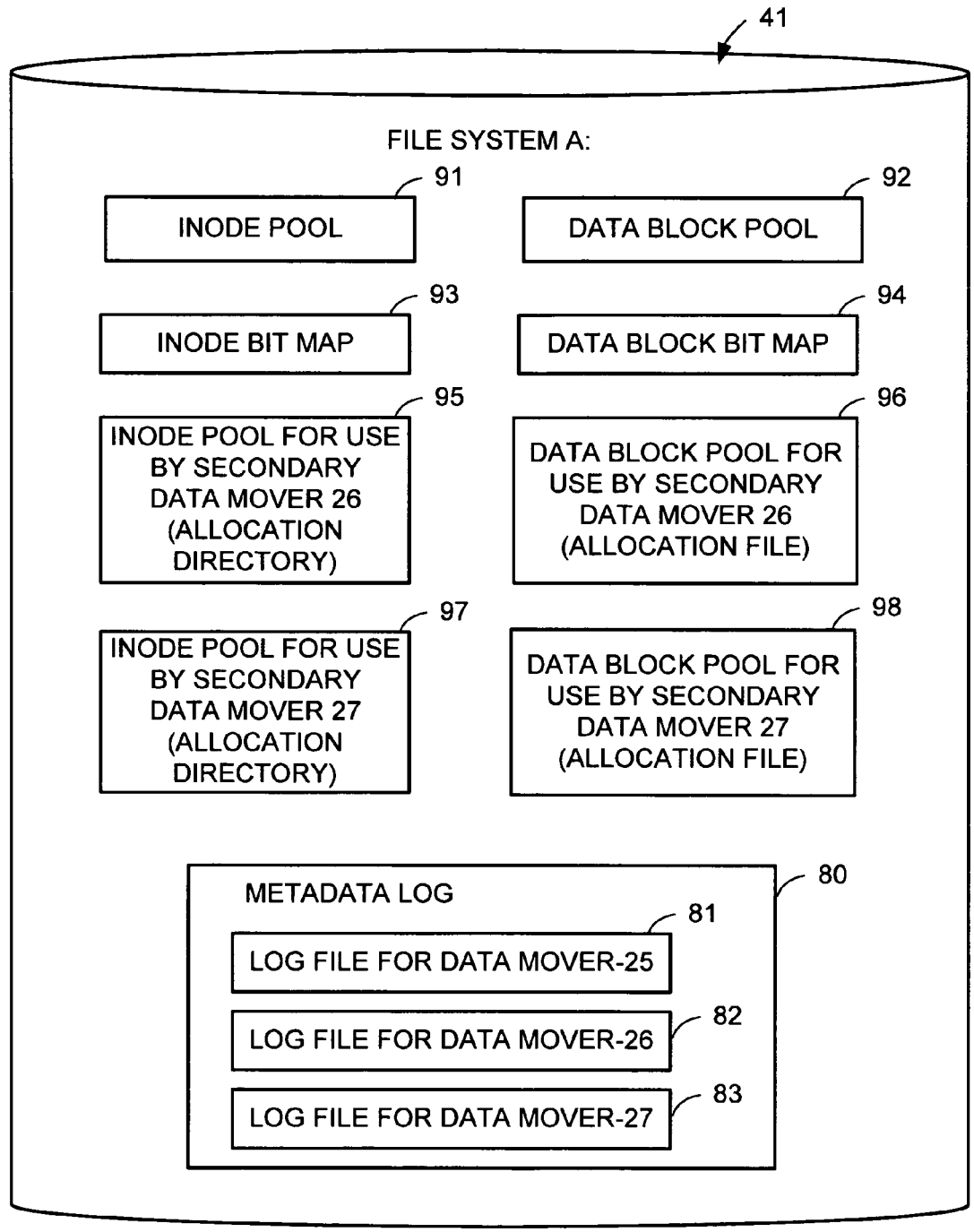
FIG. 6 shows a file system volume including a metadata log for the file system and various data structures for allocating inodes and data blocks that are linked together to create directory files and data files in the file system.

In a preferred implementation, for a file server having multiple data movers and offloading of metadata operations, the primary data mover still maintains an inode pool 91 of free inodes, a data block pool 92 of free data blocks, an inode bit map 93 indicating allocated inodes, and a data block bit map 94 indicating allocated data blocks. The primary data mover also pre-allocates a pool of inodes and a pool of data blocks to each secondary data mover to use as free inodes and free data blocks for use in creating or extending files. For example, the primary data mover creates a respective allocation directory of inodes for each secondary data mover to use, and an allocation file of data blocks for each secondary data mover to use. All of the inodes in an allocation directory are zero length files. Thus, the preferred method of allocating inodes and data blocks is a hybrid approach between centralized management by the primary data mover and distributed management by the secondary data movers. As shown in FIG. 6, for example, the file system 41 named "A:" includes an allocation directory 95 for use as an inode pool by the secondary data mover 26, an allocation file 96 for use as a data block pool by the secondary data mover 26, an allocation directory 97 for use as an inode pool by the secondary data mover 27, and an allocation file 98 for use as a data block pool by the secondary data mover 27.

FIG. 7 shows various requests used in the preferred file mapping protocol (FMP). FMP is a lightweight protocol originally designed for implementation of the metadata management techniques described in the above-cited Xu et al. U.S. Pat. No. 6,324,581 issued Nov. 27, 2001. As used in the EMC HIGHROAD (Trademark) remote access method for the EMC Celerra (Trademark) file server, the FMP protocol included a GET MAP request, an ALLOC SPACE request, a COMMIT request, and a NOTIFY request. A secondary data mover used the GET MAP request to request the primary data mover to grant a read lock and return mapping information for a specified file. A secondary data mover used the ALLOC SPACE request to request the primary data mover to allocate space to a specified file. Space could be allocated to a specified file to fill in holes in the file or to extend the file. A secondary data mover used the COMMIT request to request the primary data mover to commit a specified file to disk. The primary data mover used the NOTIFY request to notify the secondary data movers that any cached mapping information for a specified file had become invalid. In other words, the NOTIFY request was used to guarantee coherency for mapping information that was distributed among and cached in the data movers.

In a preferred implementation, new requests are added to the FMP protocol for further offloading of metadata operations. These new requests include an EXCLUSIVE LOCK INODE request, a WRITE INODE request, and a CREATE FILES INODE request. A secondary data mover uses an EXCLUSIVE LOCK INODE request to request the primary to grant an exclusive lock and return a copy of an inode for a specified file. A secondary data mover uses a WRITE INODE request to request the primary data mover to write an inode to a file system. A secondary data mover uses the CREATE FILES request to expand the secondary data mover's allocation directory.

Figure 8:
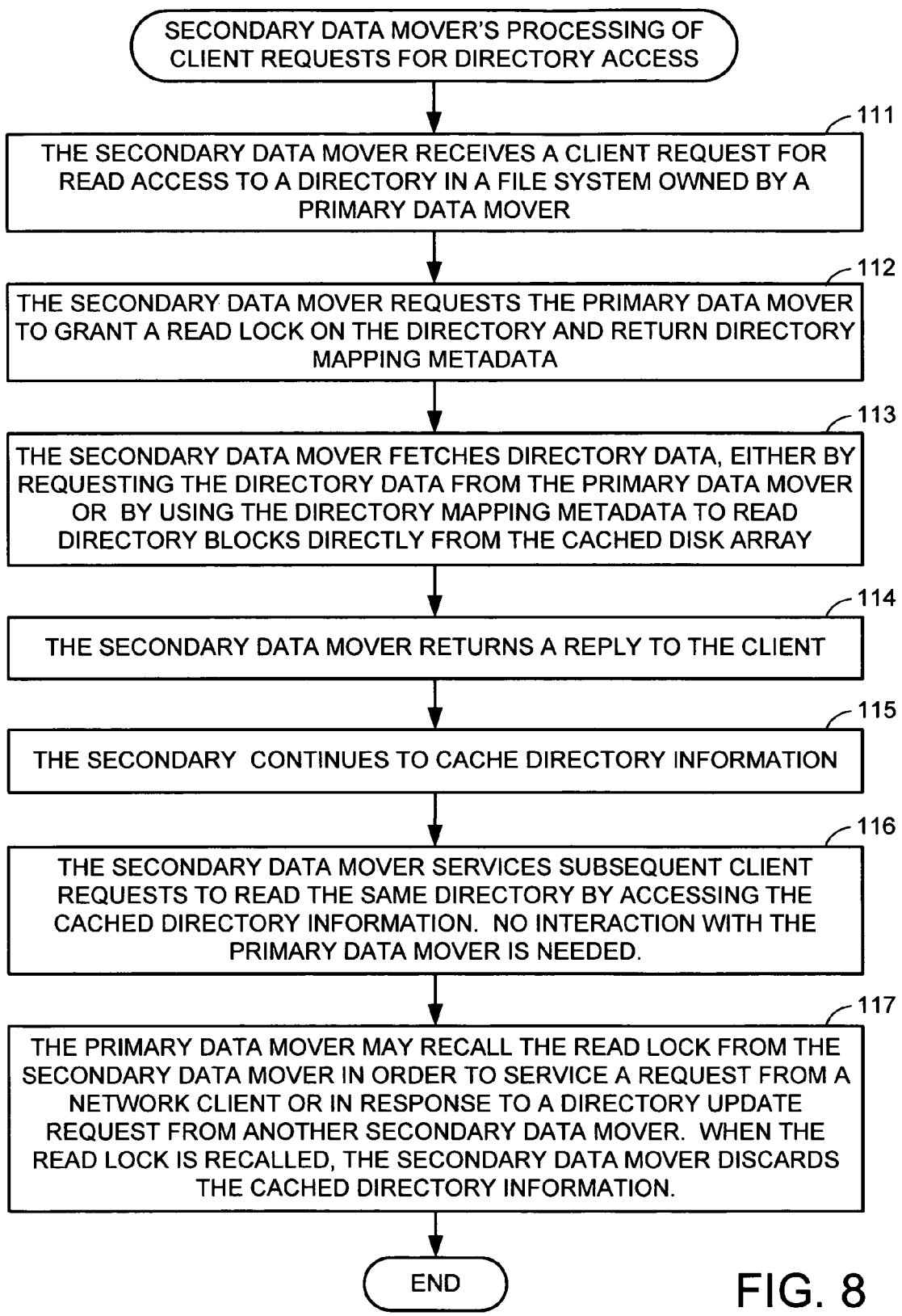
FIG. 8 is a flowchart of a secondary data mover's processing of client requests for directory access.

FIG. 8 shows a secondary data mover's processing of client requests for directory access. In a first step 111, the secondary data mover receives a client request for read access to a file. In step 112, the secondary data mover requests the primary data mover to grant a read lock on the directory and return directory mapping metadata. In step 113, the secondary data mover fetches directory data, either by requesting the directory data from the primary data mover or by using the directory mapping metadata to read directory blocks directly from the cached disk array. In step 114, the secondary data mover returns a reply to the client. In step 115, the secondary data mover continues to cache directory information. In step 116, the secondary data mover services subsequent client requests to read the same directory by accessing the cached directory information. No interaction with the primary data mover is needed. In step 117, the primary data mover may recall the read lock from the secondary data mover in order to service a request from a network client or in response to a directory update request from another secondary data mover. When the read lock is recalled, the secondary data mover discards the cached directory information.

Figure 10:
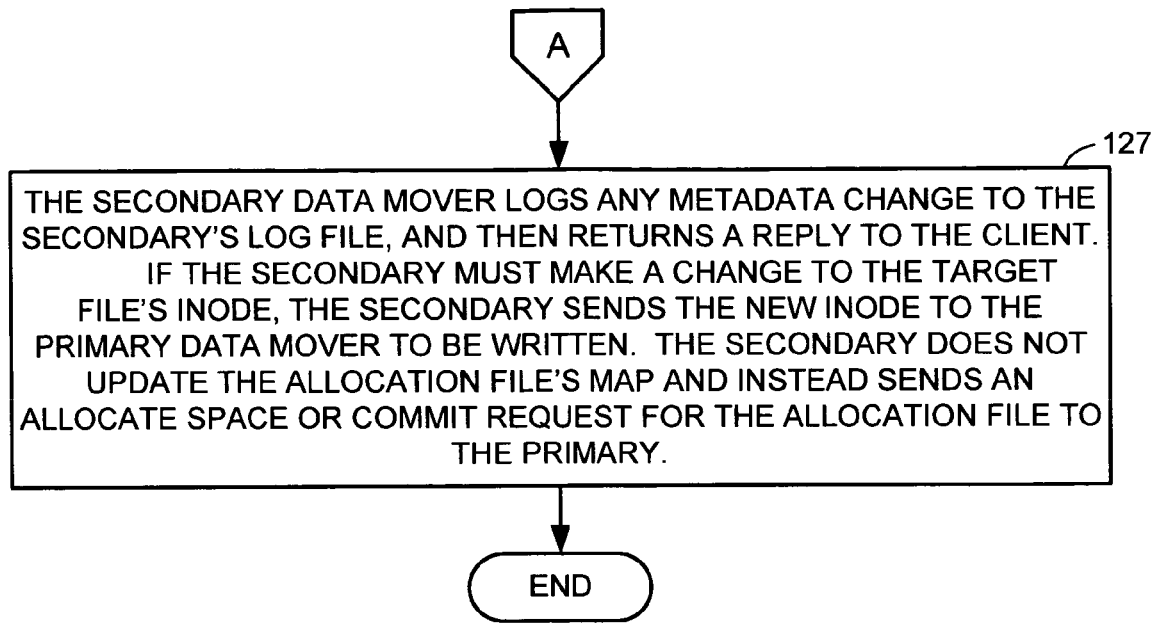

FIGS. 9 and 10 together show a secondary data mover's processing of a client request for writing to a file. In step 121, the secondary data mover receives a client request for write access to a target file in a file system owned by a primary data mover. In step 122, the secondary data mover requests the primary data mover to grant an exclusive lock on the target file, and the primary data mover grants the exclusive lock to the secondary and returns a copy of the target file's inode. In step 123, the secondary data mover reads the current mapping metadata of the target file based on the target file's inode information. In step 124, if the write is not to an existing area of the file, then execution continues to step 125. In step 125, the secondary data mover takes blocks from its allocation file to get space for writing to the target file, removes these blocks from the allocation file's mapping, and adds these blocks to the target file's mapping. From step 125, execution continues to step 126. Execution also branches from step 124 to step 126 if the write is to an existing area of the file. In step 126, the secondary data mover writes data from the client to the blocks of the target file. In step 127, the secondary data mover logs any metadata change to the secondary data mover's log file, and then returns a reply to the client. If the secondary must make a change to the target file's inode, the secondary sends the new inode to the primary data mover so that the primary data mover will write the new inode. The secondary data mover does not update the allocation file's map and instead sends an allocate space or commit request for the allocation file to the primary data mover, so that the primary data mover updates the allocation file's map.

Figure 11:
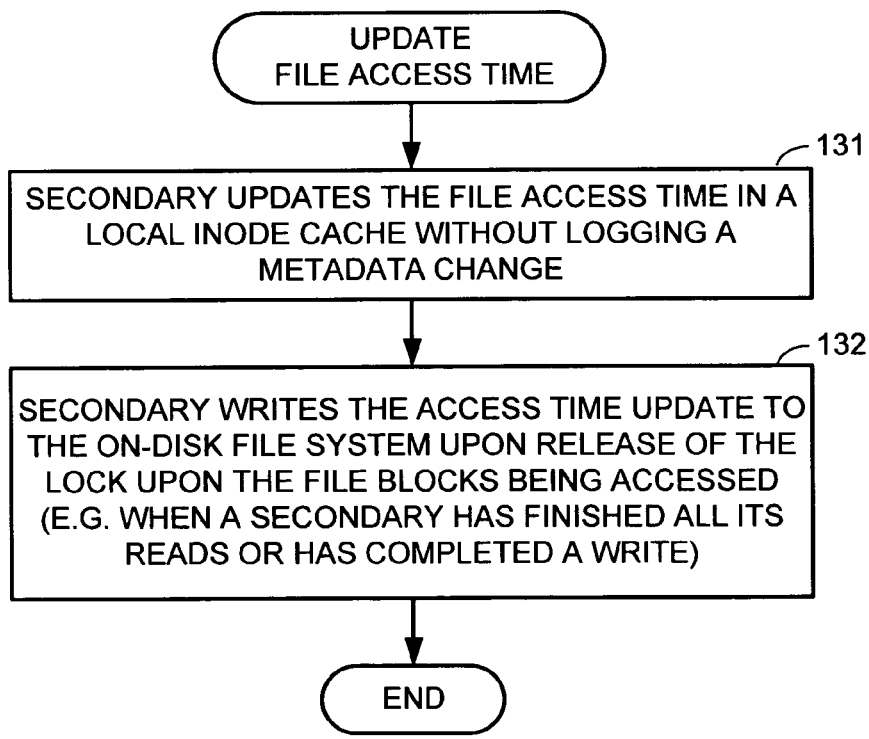
FIG. 11 is a flowchart of a procedure used by a secondary data mover for updating file access time.

FIG. 11 shows that updating of the file access time can be handled as a special case. In step 131, a secondary data mover updates the file access time in a local inode cache without logging a metadata change. This can be done without danger of data corruption for the case where updates to the access time are done out of order by multiple secondary data movers. In step 152, each secondary can write the access time update to the on-disk file system (e.g., a read-modify-write to an 8K inode block) upon release of the lock upon the file blocks being accessed (e.g., when a secondary has finished all its reads or has completed a write).

Figure 12:
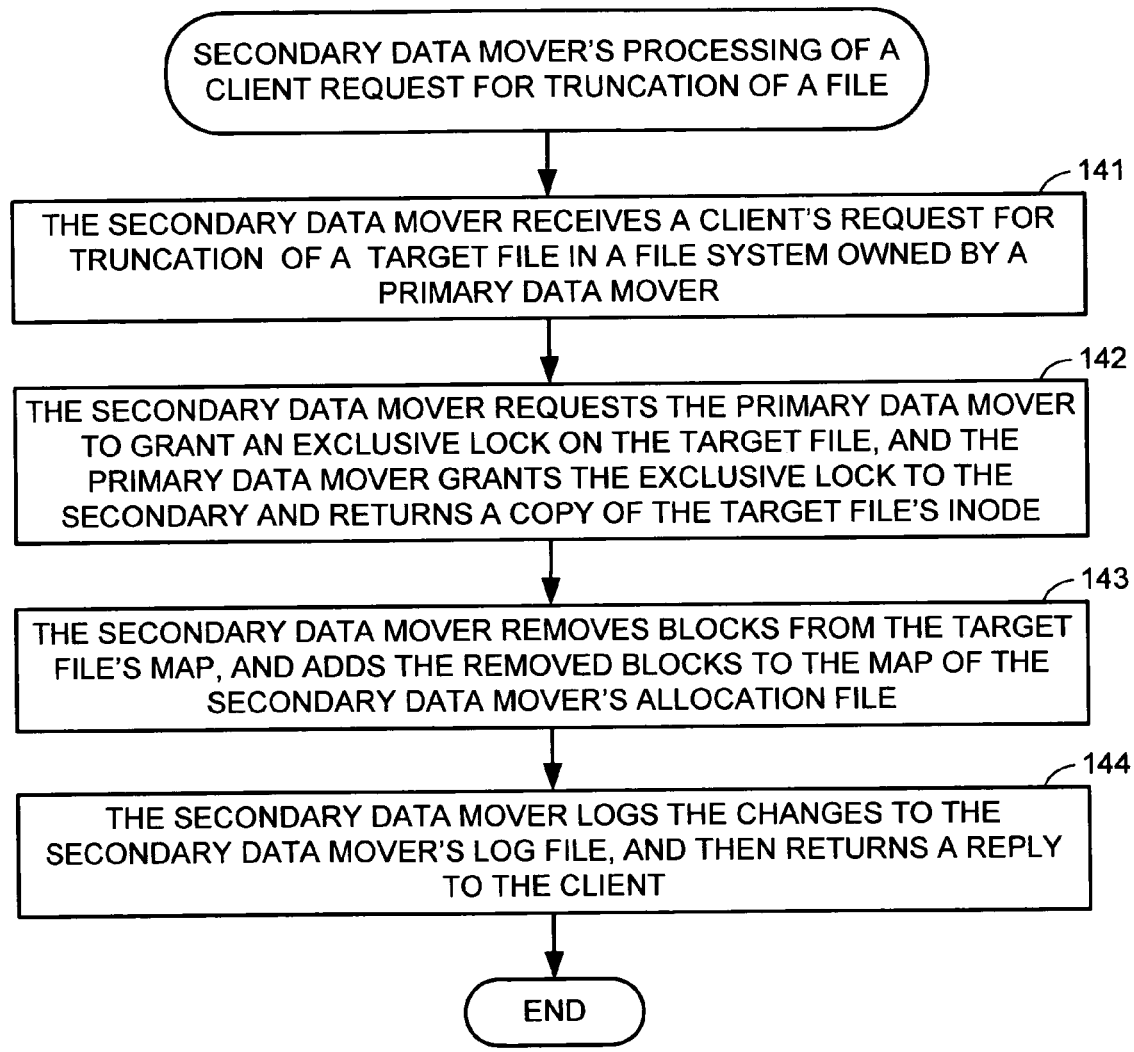
FIG. 12 is a flowchart of a secondary data mover's processing of a request for truncation of a file.

FIG. 12 shows a secondary data mover's processing of a request for truncation of a file. In a first step 141, the secondary data mover receives a client's request for truncation of a target file in a file system owned by a primary data mover. In step 142, the secondary data mover requests the primary data mover to grant an exclusive lock on the target file, and the primary data mover grants the exclusive lock to the secondary data mover and returns a copy of the target file's inode. In step 143, the secondary data mover removes blocks from the target file's map, and adds the removed blocks to the map of the secondary data mover's allocation file. In step 144, the secondary data mover logs the changes to the secondary data mover's log file, and then returns a reply to the client.

Figure 13:
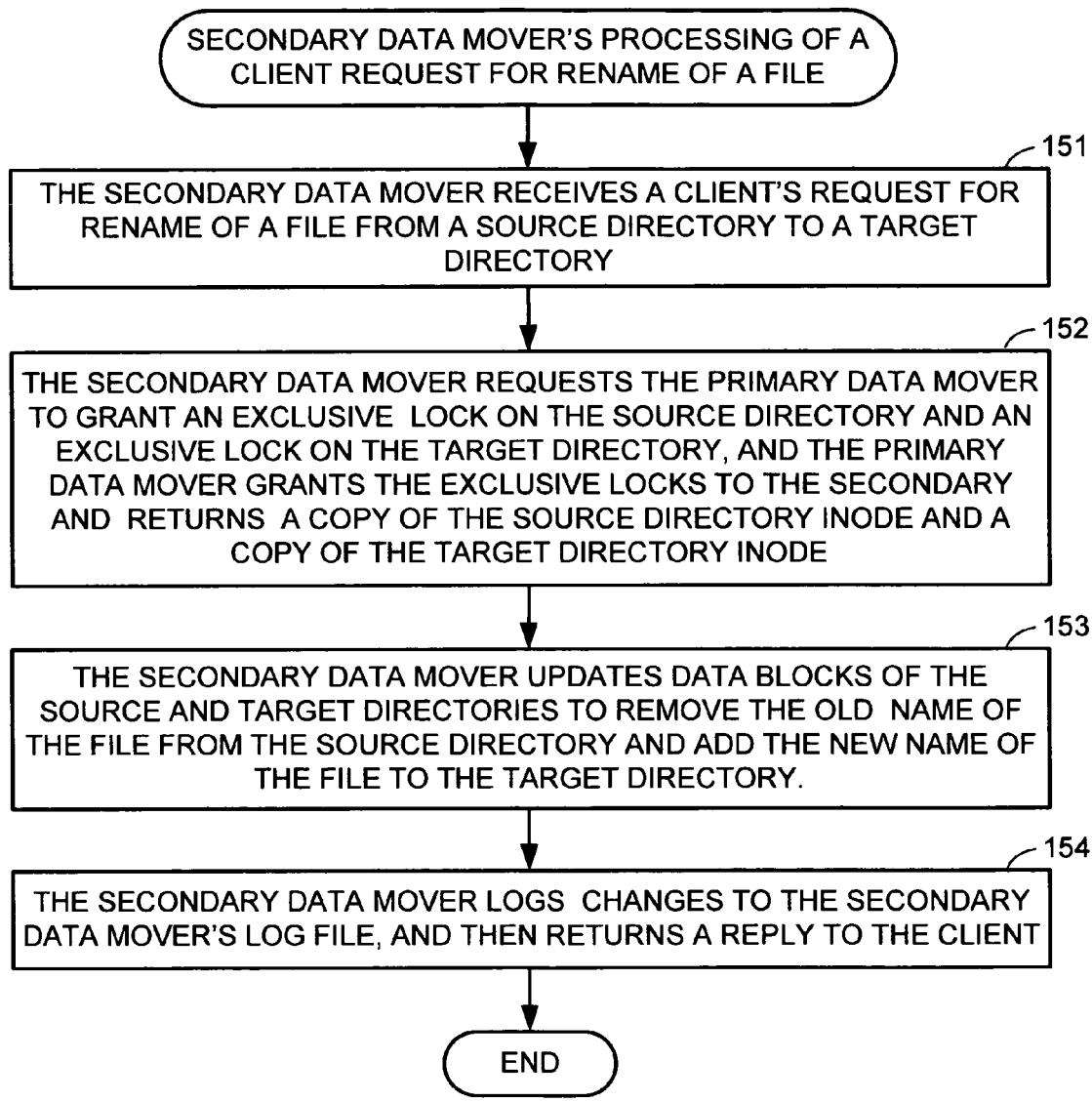
FIG. 13 is a flowchart of a secondary data mover's processing of a client request for rename of a file.

FIG. 13 shows a secondary data mover's processing of a client request for rename of a file. In a first step 151, the secondary data mover receives a request from a client for rename of a file from a source directory to a target directory. In step 152, the secondary data mover requests the primary data mover to grant an exclusive lock on the source directory and an exclusive lock on the target directory, and the primary data mover grants the exclusive locks to the secondary and returns a copy of the source directory inode and a copy of the target directory inode. In step 153, the secondary data mover updates data blocks of the source and target directories to remove the old name of the file from the source directory and add the new name of the file to the target directory. Finally, in step 154, the secondary data mover logs changes to the secondary data mover's log file, and then returns a reply to the client.

Figure 14:
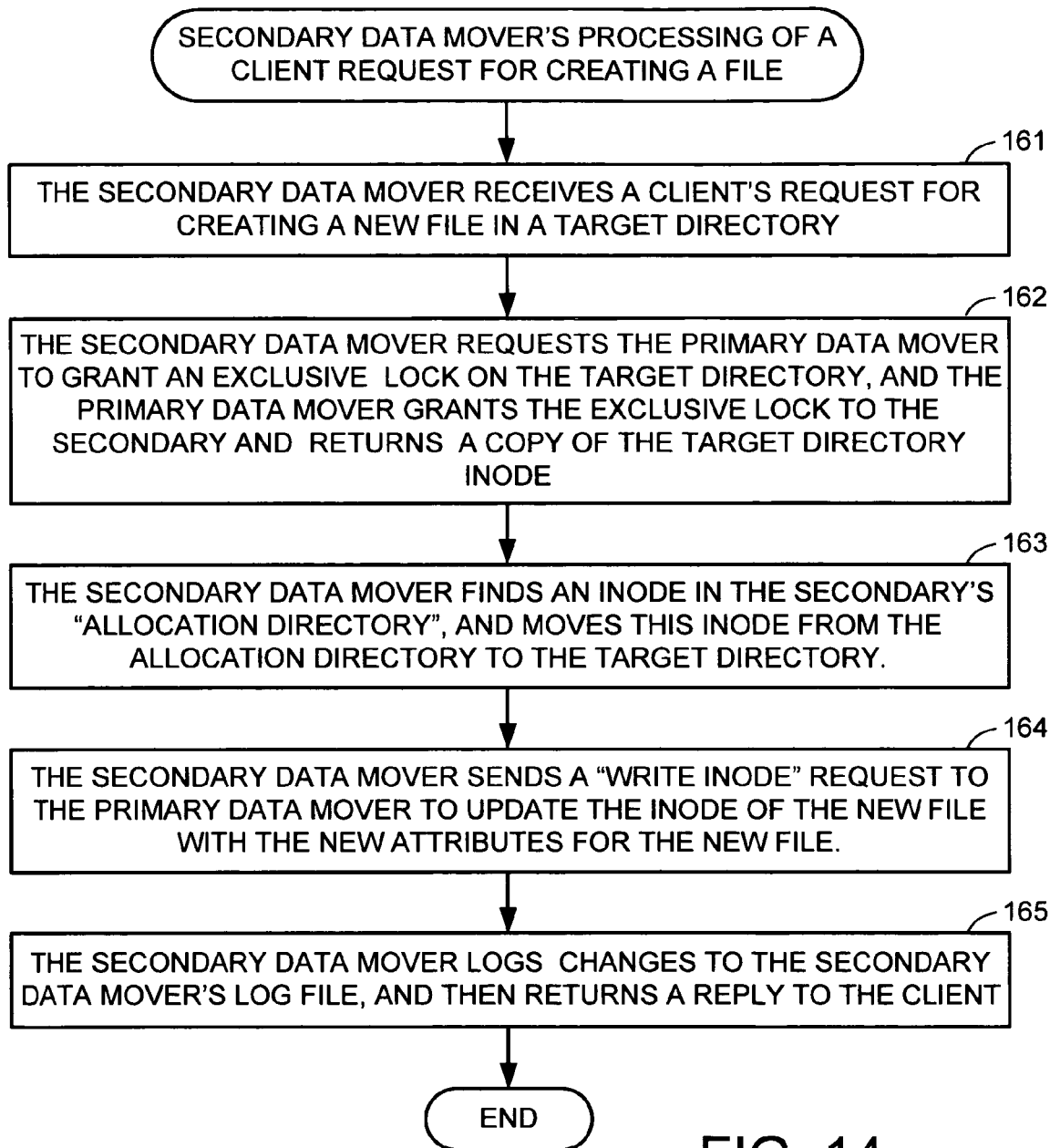
FIG. 14 is a flowchart of a secondary data mover's processing of a client request for creating a file.

FIG. 14 shows a secondary data mover's processing of a client request for creating a file. In a first step 161, the secondary data mover receives a request from a client for creating a new file in a target directory. In step 162, the secondary data mover requests the primary data mover to grant an exclusive lock on the target directory, and the primary data mover grants the exclusive lock to the secondary data mover and returns a copy of the target directory inode. In step 163, the secondary data mover finds an inode in the secondary data mover's allocation directory, and moves this inode from the allocation directory to the target directory. In step 164, the secondary data mover sends a WRITE INODE request to the primary data mover to update the inode of the new file with the new attributes for the new file. Finally, in step 165, the secondary data mover logs changes to the secondary data mover's log file, and then returns a reply to the client.

Figure 15:
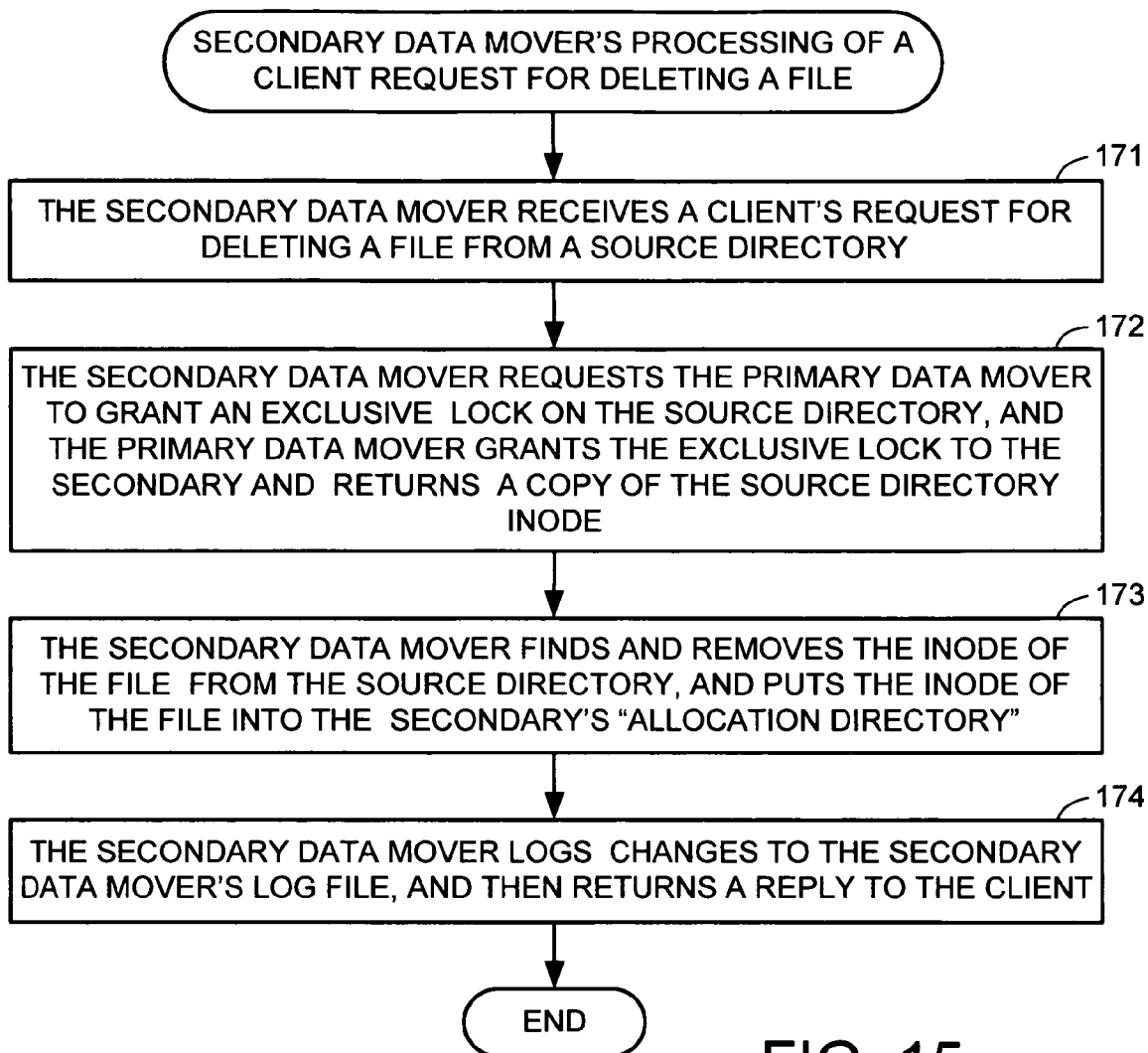
FIG. 15 is a flowchart of a secondary data mover's processing of a client request for deleting a file.

FIG. 15 shows a secondary data mover's processing of a client request for deleting a file. In a first step 171, the secondary data mover receives a client's request for deleting a file from a source directory. In step 172, the secondary data mover requests the primary data mover to grant an exclusive lock on the source directory, and the primary data mover grants the exclusive lock to the secondary data mover and returns a copy of the source directory inode. In step 193, the secondary data mover finds and removes the inode of the file from the source directory, and puts the inode of the file into the secondary data mover's allocation directory. Finally, in step 174, the secondary data mover logs changes to the secondary data mover's log file, and then returns a reply to the client.

Figure 16:
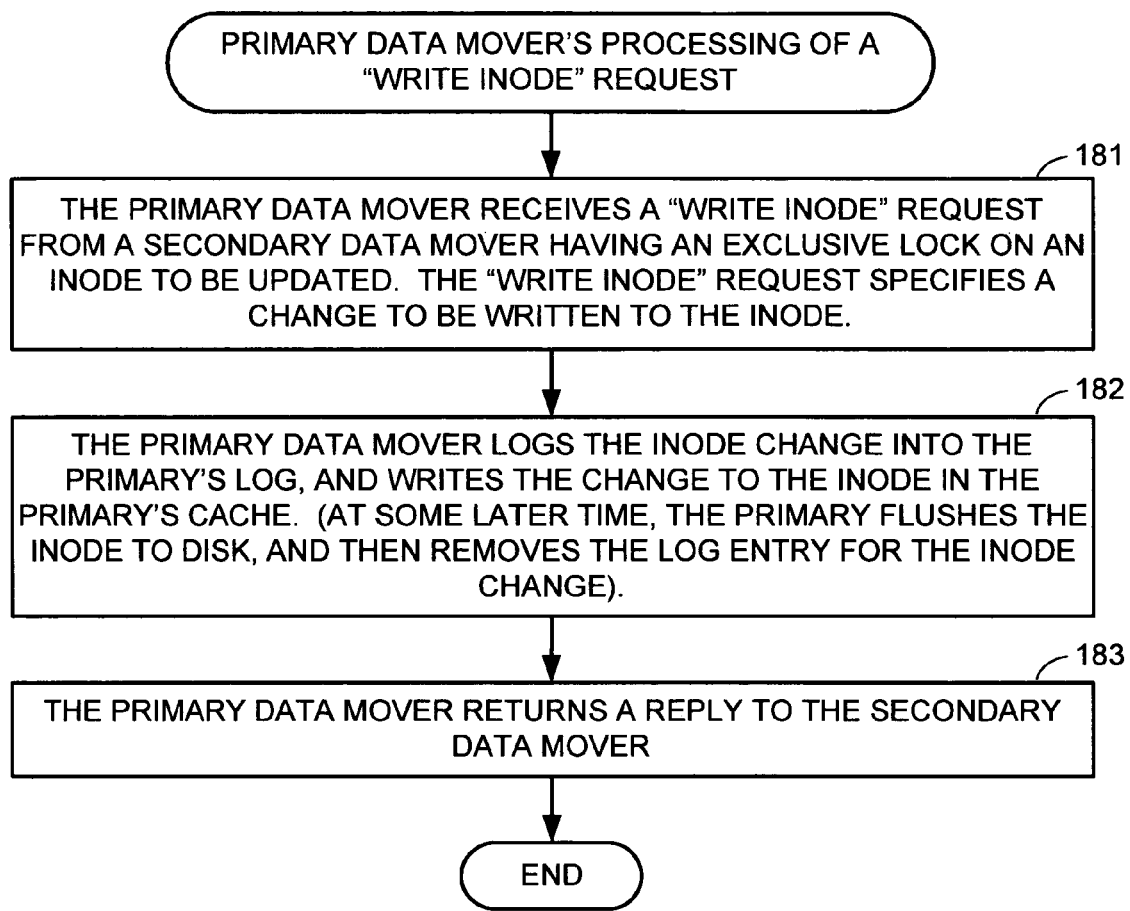
FIG. 16 is a flowchart of a primary data mover's processing of a "WRITE INODE" request.

FIG. 16 shows a primary data mover's processing of a WRITE INODE request. In a first step 181, the primary data mover receives a WRITE INODE request from a secondary data mover having an exclusive lock on an inode to be updated. The WRITE INODE request specifies a change to be written to the inode. In step 182, the primary data mover logs the inode change into the primary's log, and writes the change to the inode in the primary's cache. (At some later time, the primary flushes the inode to disk, and then removes the log entry for the inode change.) Finally, in step 183, the primary data mover returns a reply to the secondary data mover.

Figure 17:
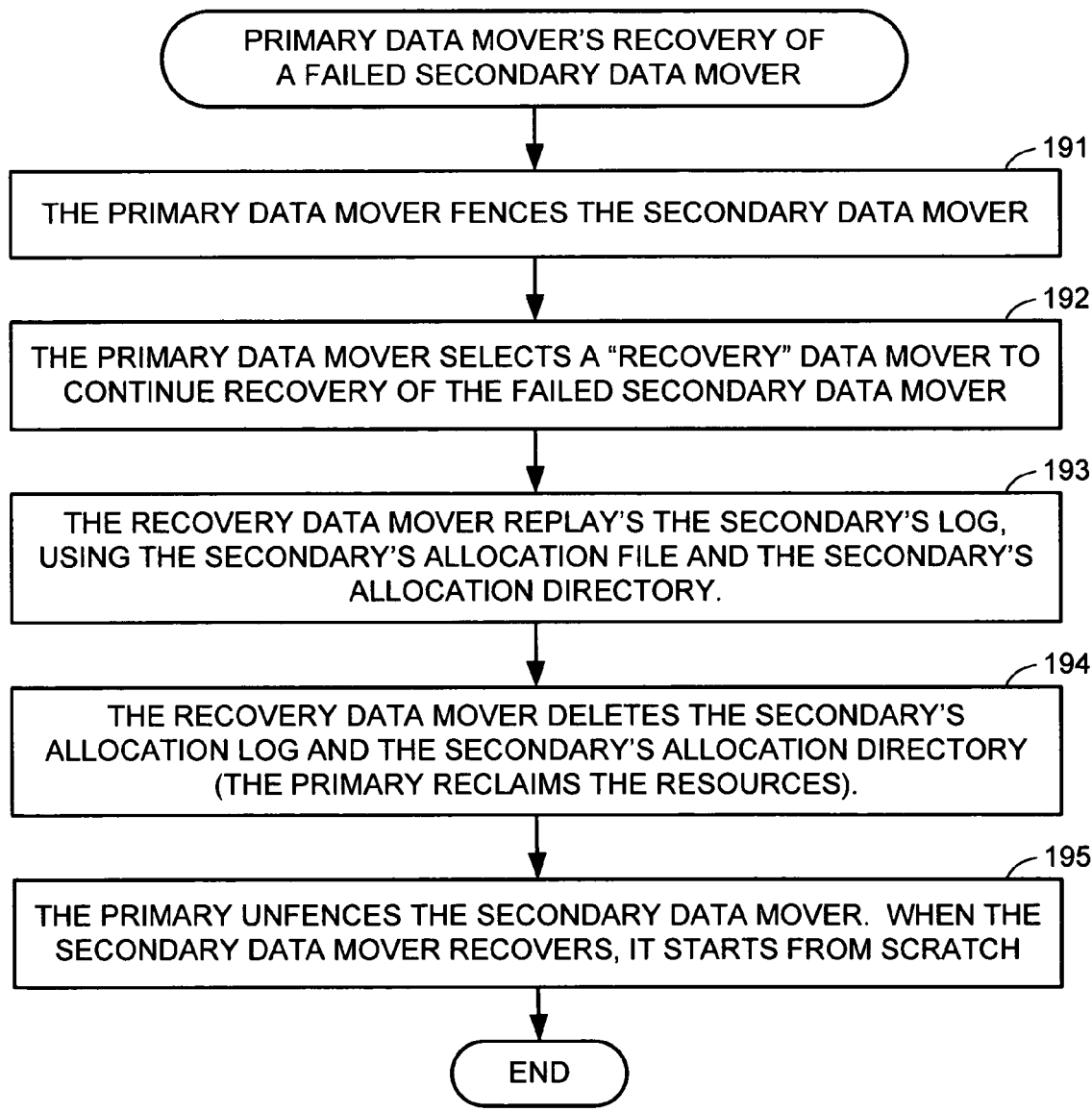
FIG. 17 is a flowchart of a primary data mover's recovery of a failed secondary data mover.

FIG. 17 shows a flowchart of a primary data mover's recovery of a failed secondary data mover. In a first step 191, the primary data mover fences the secondary data mover. This stops the primary data mover from granting any further requests or resources to the secondary data mover. In step 192, the primary data mover selects a "recovery" data mover to continue recovery of the failed secondary data mover. In step 193, the recovery data mover replay's the secondary data mover's log, using the secondary's allocation file and the secondary's allocation directory. In step 194, the recovery data mover deletes the secondary data mover's allocation log and the secondary's allocation director. Thus, the primary reclaims the resources of the failed secondary data mover. Finally, in step 195, the primary unfences the secondary data mover. When the secondary data mover recovers, it starts from scratch.

Figure 18:
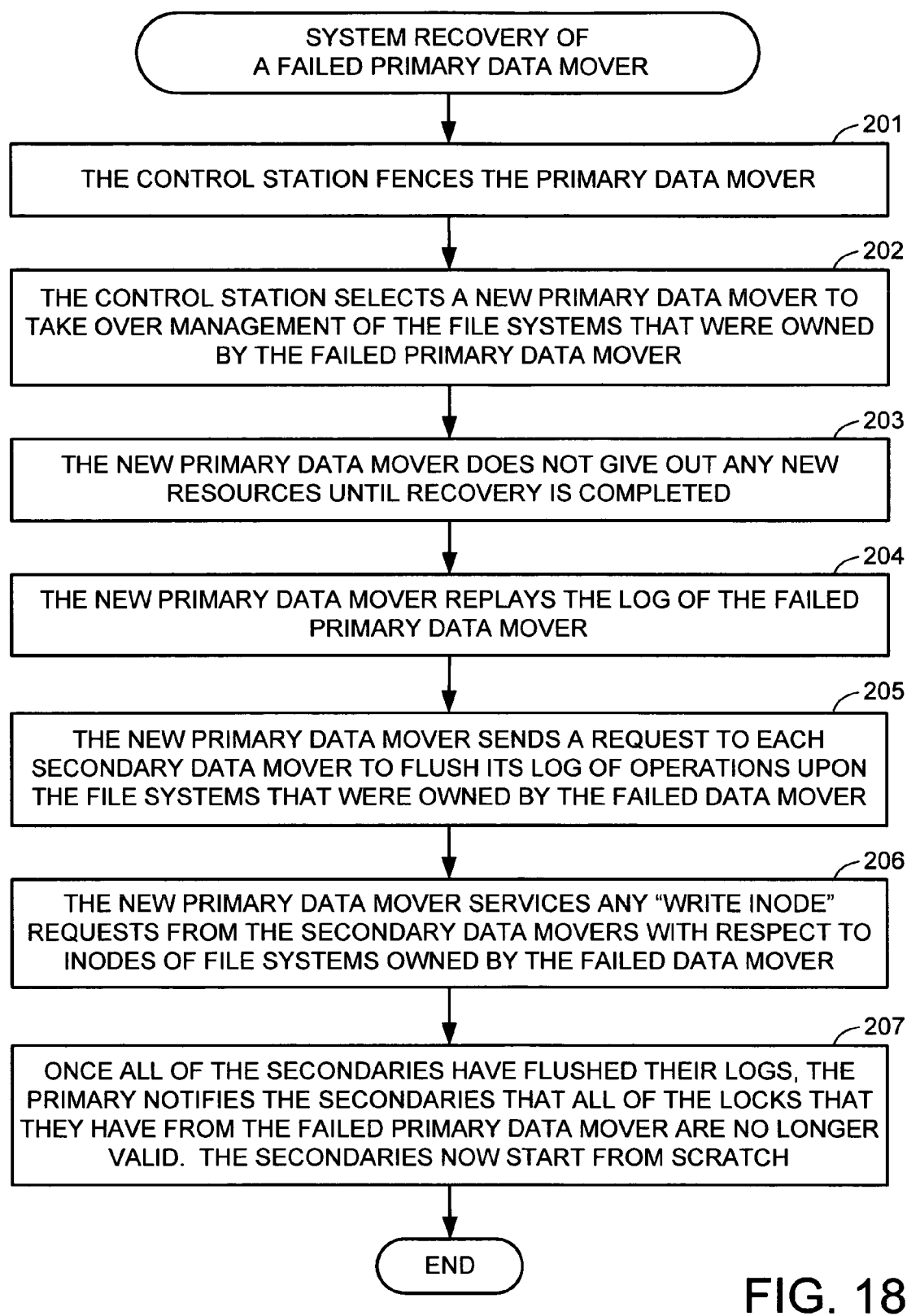
FIG. 18 is a flowchart of system recovery of a failed primary data mover.

FIG. 18 shows system recovery of a failed primary data mover. In a first step 201, the control station fences the failed primary data mover. In step 202, the control station selects a data mover to become a new primary data mover to take over management of the file systems that were previously owned by the failed primary data mover. In step 203, the new primary data mover does not give out any new resources until recovery is completed (when step 207 is finished). In step 204, the new primary data mover replays the log of the failed primary data mover. In step 205, the new primary data mover sends a request to each secondary data mover to flush its log of operations upon the file systems that were owned by the failed data mover. In step 206, the new primary data mover services any WRITE INODE requests from the secondary data movers with respect to inodes of file systems that were owned by the failed data mover. Finally, in step 207, once all of the secondary data movers have flushed their logs, the primary data mover notifies the secondary data movers that all of the locks that they have from the failed data mover are no longer valid. The secondary data movers now start from scratch.

Figure 19:
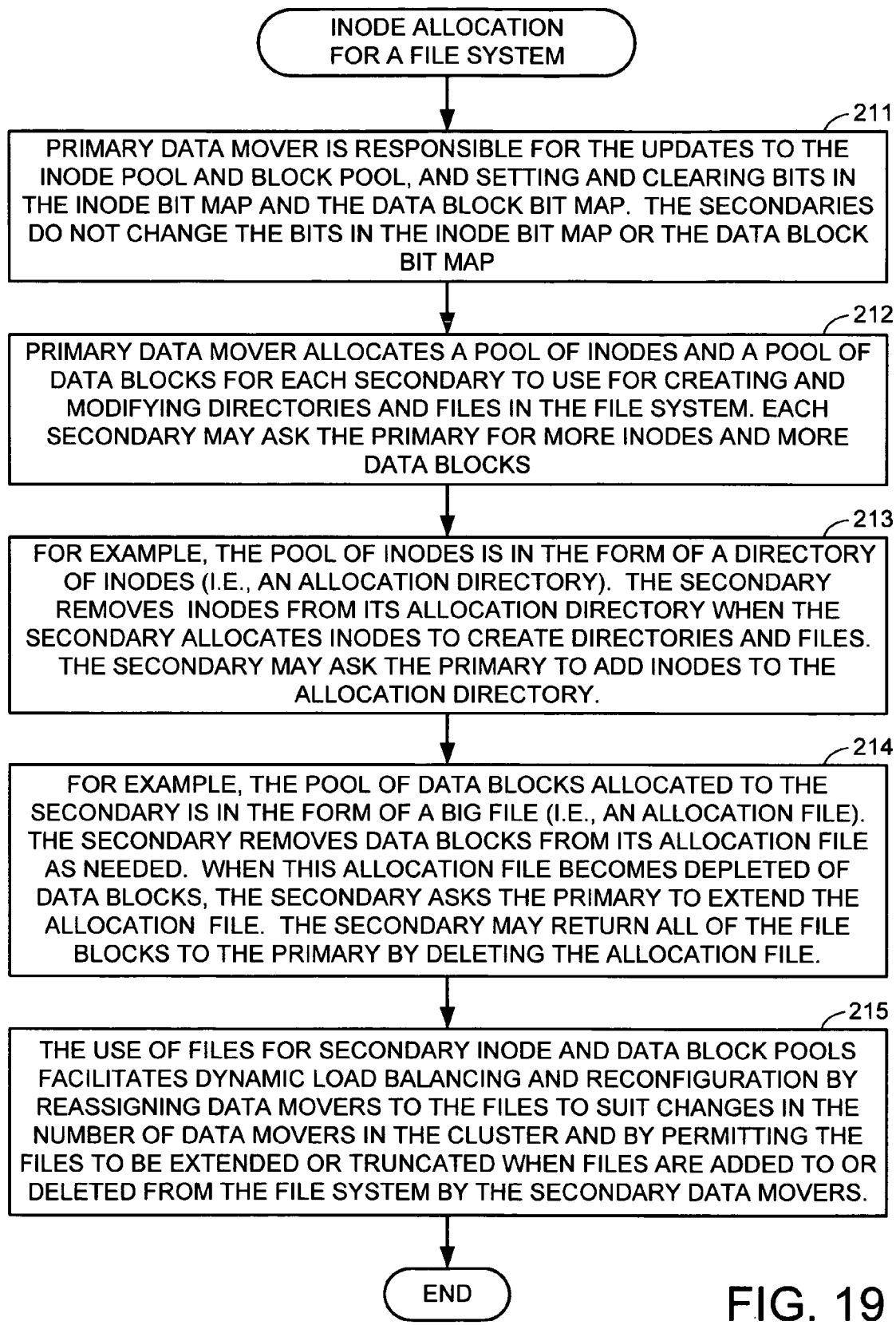
FIG. 19 is a flowchart of inode allocation for a file system.

FIG. 19 shows a preferred procedure for inode allocation for each file system in a file server system having a cluster of data movers (e.g., as shown in FIG. 1). This procedure accesses and maintains file system data structures shown in FIG. 6. In step 211, the primary data mover assumes responsibility for all of the updates to the conventional file system inode pool (91 in FIG. 9) and the conventional file system data block pool 92. The primary sets and clears the bits in the conventional file system inode bit map 93 and the conventional file system data block bit map 94. The secondary data movers do not change the bits in the inode bit map or the data block bit map.

In step 212, the primary data mover allocates a pool of inodes (95, 97 in FIG. 6) and a pool of data blocks (96, 98 in FIG. 6) for each secondary data mover to use for creating and modifying directories and data files in the file system. Each secondary may later ask the primary for more inodes and more data blocks.

In step 213, the pool of inodes for each secondary data mover, for example, is in the form of a directory of inodes (i.e., an allocation directory) for each secondary. The secondary data mover removes inodes from its allocation directory when the secondary allocates inodes to create directories and files. The secondary data mover may ask the primary data mover to add inodes to the allocation directory.

In step 214, the pool of data blocks for each secondary data mover, for example, is in the form of a big file (i.e., an allocation file). The secondary data mover removes data blocks from its allocation file as needed. When this allocation file becomes depleted of data blocks, the secondary data mover asks the primary data mover to extend the allocation file. For example, the primary data mover can easily give the secondary data mover a number of cylinder groups (64 megabyte chunks of data blocks). The secondary data mover can return all of the file blocks to the primary data by deleting the allocation file. It is also possible for one secondary to pass inodes and file blocks to another secondary.

In step 215, the use of files for secondary inode and data block pools provides a dynamic and hierarchical allocation mechanism suitable for reconfiguration to suit changes in the number of data movers in a cluster that happen to be assigned to be secondary to a particular file system. For dynamic load balancing, an administrative process changes the number of data movers assigned to be secondary for a file system based on access statistics for the file system. For example, a database keeps track of how many data movers are active and the file systems for which each data mover is primary and secondary.

In view of the above, there has been described a file server system having a cluster of server computers that share access to file systems in shared storage. One of the server computers is primary with respect to each of the file systems. In order to reduce the possibility of primary server overload when a large number of the clients happen to concurrently access the same file system, most metadata processing operations are offloaded to secondary server computers. This also facilitates recovery from failure of a primary server computer since only a fraction of the ongoing metadata operations of a primary server computer is interrupted by a failure of the primary server computer. For example, a secondary data mover may truncate, delete, create, or rename a file in response to a client request.

What is claimed is:

1. In a file server system having server computers and storage shared among the server computers, the shared storage containing a file system, access to the file system being managed by one of the server computers that is primary with respect to the file system, other server computers being secondary with respect to the file system, a method comprising:
   one of the server computers that is secondary with respect to the file system responding to a request from a client for creating, deleting, or renaming a file in the file system by requesting an exclusive lock on a source or target directory containing the file from the server computer that is primary with respect to the file system, and
   the server computer that is primary with respect to the file system responding to said one of the server computers that is secondary with respect to the file system by the server computer that is primary with respect to the file system granting an exclusive lock on the source or target directory and returning a copy of an mode of the source or target directory to said one of the server computers that is secondary with respect to the file system; and
   said one of the server computers that is secondary with respect to the file system modifying the mode of the source or target directory in order to create, delete, or rename the file in the file system;
   which includes said one of the server computers that is secondary with respect to the file system creating the file in the target directory by moving an mode for the file to the target directory from an allocation directory for said one of the server computers that is secondary with respect to the file system.

2. The method as claimed in claim 1, which includes said one of the server computers that is secondary with respect to the file system extending the allocation directory by requesting the server computer that is primary with respect to the file system to add modes to the allocation directory for said one of the server computers that is secondary with respect to the file server, and the server computer that is primary with respect to the file system adding modes to the allocation directory for said one of the server computers that is secondary with respect to the file server.

3. A file server system comprising shared storage, and multiple server computers linked to the shared storage for accessing a file system in the shared storage, wherein one of the server computers is primary with respect to the file system for managing access to the file system, and others of the server computers are secondary with respect to the file system, wherein the server computer that is primary with respect to the file system is programmed for responding to a respective request from each of the server computers that are secondary with respect to the file system for requesting the server computer that is primary with respect to the file system to grant a read lock and return directory mapping information for a specified directory;

wherein the server computer that is primary with respect to the file system is programmed for responding to a respective request from said each of the server computers that are secondary with respect to the file system for requesting the server computer that is primary with respect to the file system to extend a specified file;

wherein the server computer that is primary with respect to the file system is programmed for responding to a respective request from said each of the server computers that are secondary with respect to the file system for requesting the server computer that is primary with respect to the file system to commit a specified file to disk storage;

wherein the server computer that is primary with respect to the file system is programmed for responding to a respective request from said each of the server computers that are secondary with respect to the file system for requesting the server computer that is primary with respect to the file system to grant an exclusive lock on an mode for a specified file and return a copy of the mode for the specified file;

wherein the server computer that is primary with respect to the file system is programmed for responding to a respective request from said each of the server computers that are secondary with respect to the file system for requesting the server computer that is primary with respect to the file system to write changes to an mode for a specified file; and wherein each of the server computers that are secondary with respect to the file system is programmed for creating a file in the specified directory by moving an mode for the file to the target directory from a respective allocation directory for said each of the server computers that are secondary with respect to the file system; and wherein the server computer that is primary with respect to the file system is programmed for responding to a respective request from said each of the server computers that are secondary with respect to the file system for extending the respective allocation directory for said each of the server computers that are secondary with respect to the file system by adding modes to the respective allocation directory for said each of the server computers that are secondary with respect to the file system.

4. A file server system comprising shared storage, and multiple server computers linked to the shared storage for accessing a file system in the shared storage, wherein one of the server computers is primary with respect to the file system for managing access to the file system, and others of the server computers are secondary with respect to the file system, wherein the server computer that is primary with respect to the file system is programmed for responding to a respective request from each of the server computers that are secondary with respect to the file system for requesting the server computer that is primary with respect to the file system to grant a read lock and return directory mapping information for a specified directory;

wherein the server computer that is primary with respect to the file system is programmed for responding to a respective request from said each of the server computers that are secondary with respect to the file system for requesting the server computer that is primary with respect to the file system to extend a specified file;

wherein the server computer that is primary with respect to the file system is programmed for responding to a respective request from said each of the server computers that are secondary with respect to the file system for requesting the server computer that is primary with respect to the file system to commit a specified file to disk storage;

wherein the server computer that is primary with respect to the file system is programmed for responding to a respective request from said each of the server computers that are secondary with respect to the file system for requesting the server computer that is primary with respect to the file system to grant an exclusive lock on an mode for a specified file and return a copy of the mode for the specified file;

wherein the server computer that is primary with respect to the file system is programmed for responding to a respective request from said each of the server computers that are secondary with respect to the file system for requesting the server computer that is primary with respect to the file system to write changes to an mode for a specified file; and wherein the file system includes an mode pool, a data block pool, an mode bit map, a data block bit map, and for said each of the server computers that are secondary with respect to the file system:

a respective allocation directory for providing modes to be used by said each of the server computers that are secondary with respect to the file system for adding modes to directories; and a respective allocation file for providing file blocks to be used by said each of the server computers that are secondary with respect to the file system for adding file blocks to files.

* * * * *